United States Patent [19]
Zoltan

[11] 3,902,083
[45] Aug. 26, 1975

[54] PULSED DROPLET EJECTING SYSTEM

[75] Inventor: Steven I. Zoltan, Shaker Heights, Ohio

[73] Assignee: Gould Inc., Chicago, Ill.

[22] Filed: Oct. 12, 1973

[21] Appl. No.: 462,156

Related U.S. Application Data

[62] Division of Ser. No. 260,013, June 5, 1972, which is a division of Ser. No. 70,838, Sept. 9, 1970, Pat. No. 3,683,212.

[52] U.S. Cl. ............................................... 310/8.1
[51] Int. Cl.² .......................................... H01L 41/10
[58] Field of Search .... 310/8, 8.1, 8.2, 8.3, 8.5–8.7, 310/26; 259/1 R; 417/322; 346/75, 140

[56] References Cited
UNITED STATES PATENTS

| | | | |
|---|---|---|---|
| 2,512,743 | 6/1950 | Hansell | 310/8.2 X |
| 3,215,078 | 11/1965 | Stec | 310/8 X |
| 3,270,672 | 9/1966 | Haines et al. | 310/8 |
| 3,371,233 | 2/1968 | Cook | 310/8.1 |
| 3,441,875 | 4/1969 | Shoh | 310/8.1 X |
| 3,452,360 | 9/1969 | Williamson | 346/140 |
| 3,614,486 | 10/1971 | Smiley | 310/8.1 X |

Primary Examiner—Mark O. Budd
Attorney, Agent, or Firm—Eber J. Hyde

[57] ABSTRACT

An electro-acoustic transducer is coupled to liquid in a conduit which terminates in a small orifice adjacent to the transducer. Preferably, the acoustic impedance of the supply portion of the conduit is large compared with the acoustic impedance of the orifice. The liquid is under small or zero static pressure. Surface tension at the orifice prevents liquid flow when the transducer is not actuated. An electrical pulse with short rise time causes sudden volume change at the transducer, thereby creating an acoustic pressure pulse having sufficient amplitude to overcome the surface tension at the orifice and eject a small quantity of liquid therefrom. Thereafter, the pulse decays slowly, holding the rate of change of volume low enough so that the resulting pressure decrease is not sufficient to overcome the surface tension. Consequently, liquid flows from the supply portion of the orifice into the transducer to replace the liquid previously ejected, without drawing in air through the orifice.

6 Claims, 10 Drawing Figures

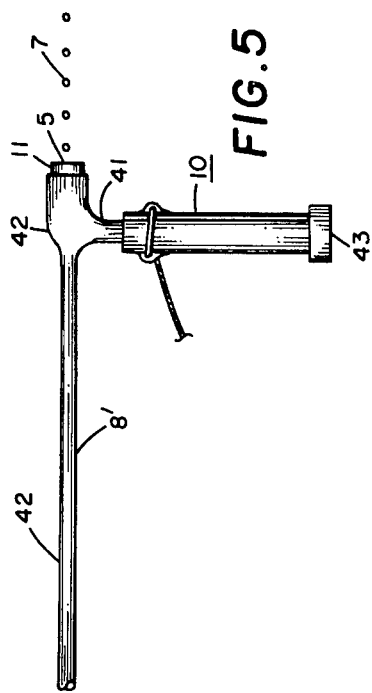
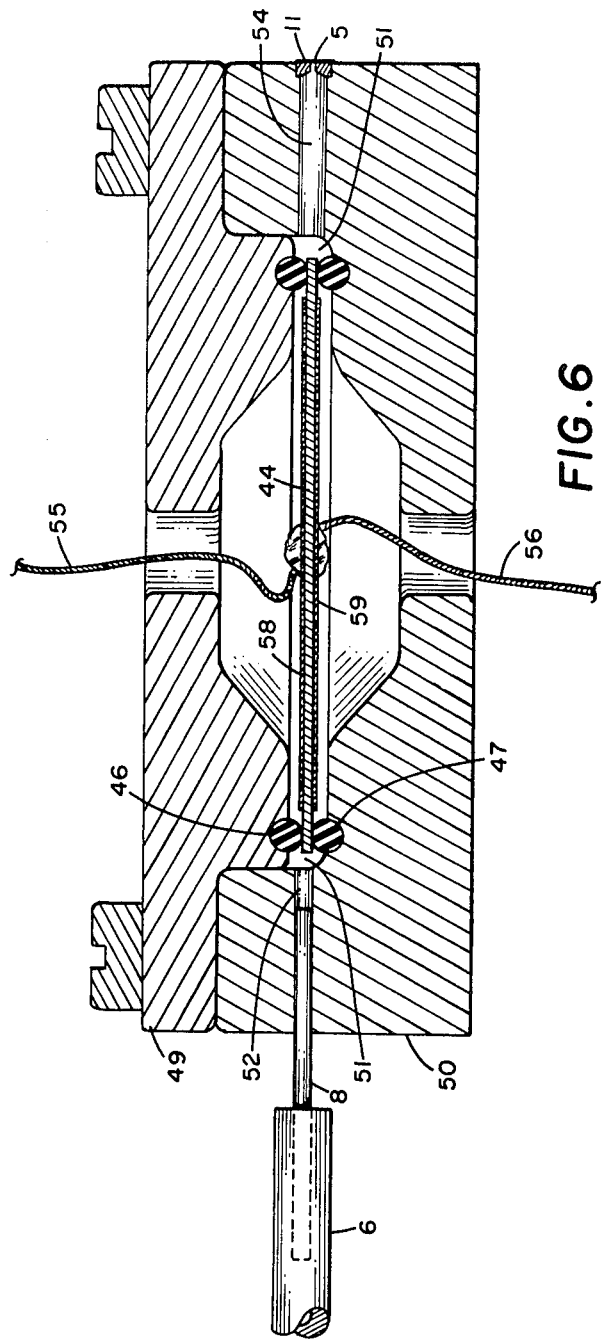

3,902,083

PULSED DROPLET EJECTING SYSTEM

This is a division of application Ser. No. 260,013, filed June 5, 1972 which application was a division of Ser. No. 70,838, filed Sept. 9, 1970, now U.S. Pat. No. 3,683,212.

BACKGROUND OF THE INVENTION

1. Field of the Invention

This invention pertains to a system for ejecting small quantities of liquid suitable for use in apparatus such as ink jet printers and recorders.

2. Description of the Prior Art

Printers and recorders of various kinds have been developed which employ a stream of ink droplets. The ink under static pressure is expelled through a small orifice. The emerging stream of ink breaks up into the droplets which tend to be of non-uniform size and spacing. It has been found that ultrasonic vibrations of suitable frequency applied to the nozzle or to the ink supply tend to regularize the spacing and size of the droplets. In some applications, such as character printers and facsimile recorders, it is necessary to prevent, controllably, some of the droplets from reaching the record medium. In U.S. Pat. No. 3,298,030 to Lewis and Brown, the unwanted droplets are deflected electrostatically away from the record medium into an ink dump. In U.S. Pat. No. 3,416,153 to Hertz et al., the ink jet is propelled through an opening in a shield to the record medium. When droplets are not wanted, the stream is dispersed by an electric field so that it is intercepted by the shield These methods of droplet control are relatively complicated and expensive.

SUMMARY OF THE INVENTION

The principal object of this invention is to provide a system which ejects a small quantity of liquid only upon electrical command.

Another object is to provide such a system which does not require a pressurized liquid supply.

Another object is to provide a system which ejects liquid upon electrical command, the quantity at each command being controllable.

According to the invention a conduit having a small orifice is supplied with liquid from a reservoir. An electroacoustic transducer adapted to displace a small volume of liquid in response to an electrical signal is coupled to the liquid adjacent to the orifice. The orifice is sufficiently small so that surface tension prevents exit of liquid through the orifice under quiescent conditions. Means are provided for applying to the transducer, each time it is desired to have liquid expelled from the orifice, an electrical pulse having polarity tending to cause exit displacement of liquid from said transducer.

BRIEF DESCRIPTION OF THE DRAWINGS

FIG. 1a shows a modification of the system of FIG. 1.

FIG. 1b shows another modification of the system of FIG. 1.

FIG. 5 shows another transducer-orifice arrangement.

FIG. 6 is a sectional view of still another transducer-orifice arrangement.

DESCRIPTION OF THE PREFERRED EMBODIMENTS

Figure 1:
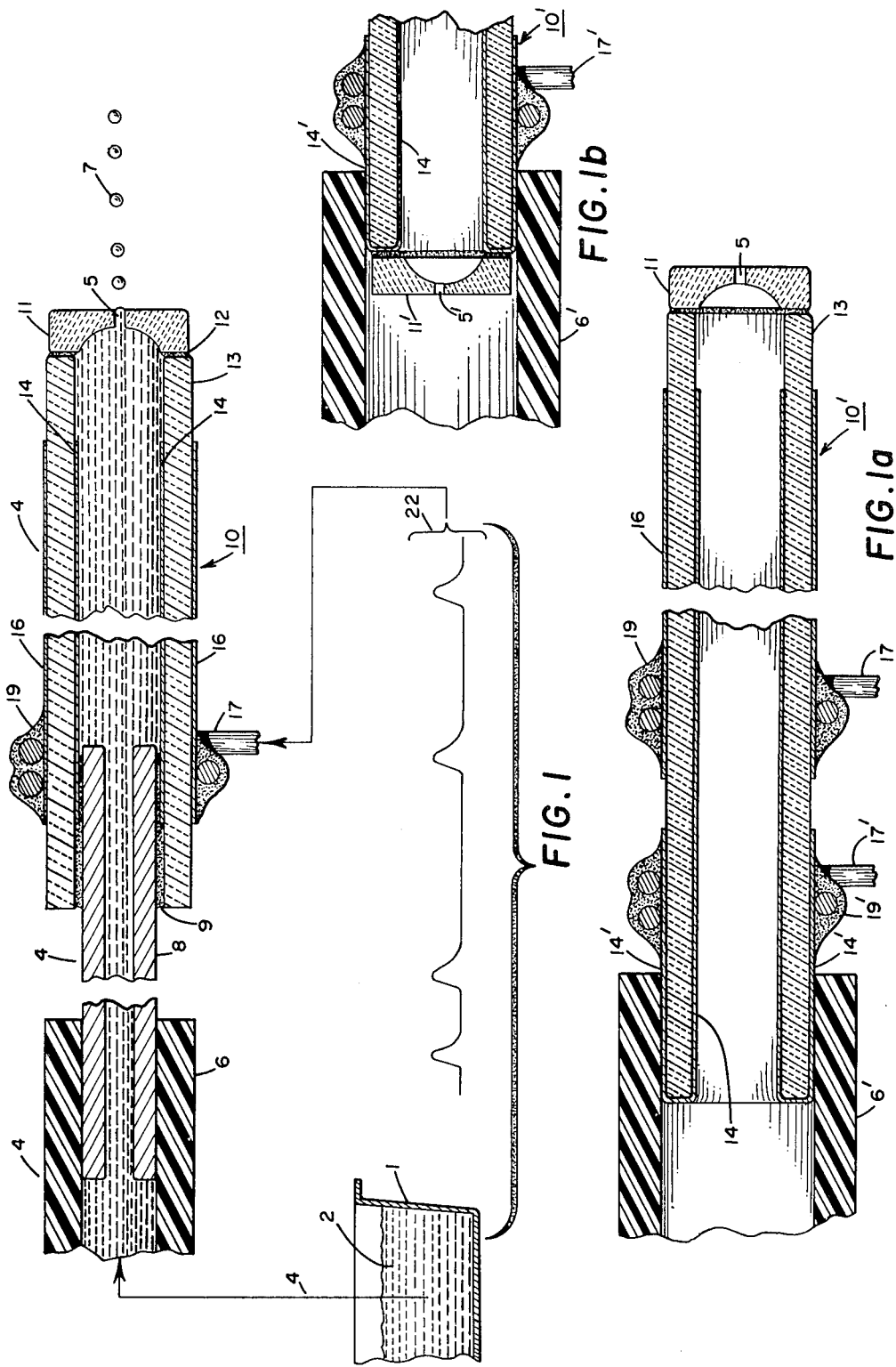
FIG. 1 shows a system according to the invention partly in section and partly schematic.

Referring to FIG. 1, a reservoir shown schematically at 1 contains ink or other liquid 2. A conduit indicated generally by reference characters 4 communicates with liquid 2 in the reservoir and is filled with the liquid. A small orifice 5 in conduit 4 is provided for exit of liquid, shown as droplets 7.

Conduit 4 comprises a length of small bore tubing 8, electroacoustic transducer 10, and orifice plate 11. Tube 8 may extend to the reservoir, or, as shown, conduit 4 may include a larger diameter portion 6, such as plastic tubing, connecting tube 8 with the reservoir.

Transducer 10 comprises a length of small diameter piezoelectric ceramic tubing 13. The diameter may, for example, be about 0.05 inch. Tube 13 is provided with electrode 14 on the inner surface and electrode 16 on the outer surface. The electrodes, as shown, do not extend to the ends of tube 13, but full length electrodes may be employed if desired. Tube 13 is polarized radially.

A thin wire 17 is wrapped around tube 13 in contact with outer electrode 16 and soldered thereto, as shown at 19. Wire 17 thus serves as one electrical terminal of the transducer.

Tube 8, made of any suitable metal, such as copper or stainless steel, is cemented into the end of ceramic tube 13 by means of conductive epoxy 9 which contacts inner electrode 14. Thus, tube 8 serves as the second electrical terminal for the transducer.

For orifice plate 11, it is convenient to use a jewel watch bearing. Such jewels are readily available at low cost and have accurately controlled dimensions in the range suitable for the present use. Orifice 5 may, for example, have diameter and length on the order of 0.06 millimeter. Jewel 11 may be attached to the end of transducer 10 by means of an epoxy adhesive 12.

Transducer 10 operates by virtue of the well-known piezoelectric effect. When a dc voltage is applied between the electrodes the length and the inside diameter of the tube both increase or decrease slightly, depending on the polarity in relation to the polarity of the polarizing dc voltage use during manufacture. The response is nearly instantaneous, being retarded very slightly by inertia reaction.

When it is desired to have a small quantity of liquid expelled from orifice 5, a short rise time voltage pulse is applied to the transducer at terminals 8 and 17, the polarity being selected to cause contraction of the transducer. The resulting sudden decrease in the enclosed volume causes a small amount of liquid to be expelled from orifice 5. Some liquid also is forced by the pressure pulse back into tube 8, but the amount is relatively small, due to the high acoustic impedance created by the length and small bore of the tube.

The voltage pulse is allowed to decay relatively slowly and the transducer, therefore, expands slowly to its initial volume. Due to the small rate of change of volume during decay, the accompanying pressure reduction is too small to overcome the surface tension at orifice 5. Consequently, liquid flows into the tranducer from tube 8 to replace the liquid previously expelled, without drawing in air through orifice 5.

From the foregoing, it may be seen that the system of this invention ejects a small quantity of liquid on command. The command signal is the short rise time pulse. By means of simple circuitry, command pulses may be supplied to cause ejection of a succession of small quantities of liquid according to any desired time pattern, limited only by the maximum response speed of the system. In FIG. 1 a train of command pulses corresponding to exiting droplets 7 is illustrated at 22.

Static pressure on the liquid is not required. However, small positive or negative pressure does not interfere with operation. The chief requirement being that such static pressure alone must not be great enough to overcome the surface tension of the liquid at orifice 5.

When the actuating electrical pulses have energy below the level required to overcome the surface tension at the orifice, droplets are not expelled, but under stroboscopic illumination the liquid can be observed bulging out of the orifice momentarily during each pulse. At somewhat higher driver energy levels, will developed single droplets are expelled, one for each pulse. At still higher energy levels, additional liquid is expelled in the form of additional, separate droplets, or the total amount of liquid expelled at each drive pulse may take the form of long cylinders of liquid with rounded ends. Thus, the quantity of liquid expelled at each pulse can be controlled by controlling the energy in the driving pulse. This enables use of the invention in recorders required to print with controlled shading, i.e., with gray scale, without the necessity of producing multiple ink spots per picture element.

Considerable latitude is available in the design of systems according to this invention. The interacting design variables are numerous and, as yet, a mathematical design technique has not been developed. However, the following guide lines and example should enable those skilled in electroacoustics to arrive at a satisfactory design.

To avoid wasting an excessive part of each transducer pulse in driving liquid from the transducer toward the reservoir, it is desirable to have relatively high acoustic impedance looking from the transducer into the supply portion of the conduit, as provided by small bore tube 8 in FIG. 1. However, this is not a requirement. Satisfactory performance may be obtained without providing any constriction in the conduit. A suitable arrangement is shown in FIG. 1a.

In FIG. 1a, liquid from a reservoir, not shown, is supplied to transducer 10' by plastic hose 6' which is forced over the end of the transducer. Electrical connection to the inner electrode 14 is provided by extending the electrode over the end of ceramic tube 13 to the outer surface, as shown at 14'. Thin wire conductor 17' is secured to electrode extension 14' by solder 19' and acts as a terminal for the transducer. With this arrangement, somewhat higher amplitude electrical pulses are required to expel liquid.

FIG. 1b shows a modification of the construction of FIG. 1a in which the supply line acoustic impedance is made at least as high as the impedance of the exit orifice, not including the effect of surface tension at the orifice. The modification consists in cementing to the inlet end of the transducer 10' a jewel 11' having opening 5' with the same dimensions as exit orifice 5.

Although the arrangements of FIGS. 1a and 1b are satisfactory, generally it is desirable to provide higher acoustic impedance at the transducer inlet. In the construction of FIG. 1, this is accomplished by use of small bore tube 8. Other alternatives include a thin slit, or a porous member, or other acoustic resistance, at the transducer inlet through which the liquid must pass. Furthermore, some advantage would accrue when using a tube such as 8 in FIG. 1, by adding an acoustic resistance at the inlet end dimensioned to act as a matched acoustic termination for the tube as a transmission line. This would reduce, or eliminate, acoustic resonance effects in tube 8. However, excellent results have been obtained without such termination.

The change in volume within transducer 10, when the latter is pulsed, must exceed the volume of liquid to be ejected at orifice 5. The ceramic composition and the dimensions of tube 13 and the energy of the actuating pulses are factors that may be traded in arriving at a suitable design. Good results have been attained with transducer volume change calculated to be about four times the volume of the liquid to be expelled. For a fully electroded thin wall tube, unrestrained by end clamping or acoustic load, the fractional volume change due to the piezoelectric effect is approximately:

$$(\Delta v/v) = -3d_{31} E/t$$

where
$(\Delta v/v)$ = volume change per unit volume
$d_{31}$ = piezoelectric strain constant
$E$ = applied voltage
$t$ = thickness of tube wall Care must be taken to measure wall thickness $t$ in units consistent with the units used in expressing $d_{31}$, usually MKS units. The negative sign indicates contraction when the applied voltage has the same polarity as the original polarizing voltage.

Another requirement is that the rate of change of volume must be sufficient in relation to the acoustic impedance loading the transducer to develop enough pressure to overcome the surface tension at orifice 5.

Figures 2, 2A:
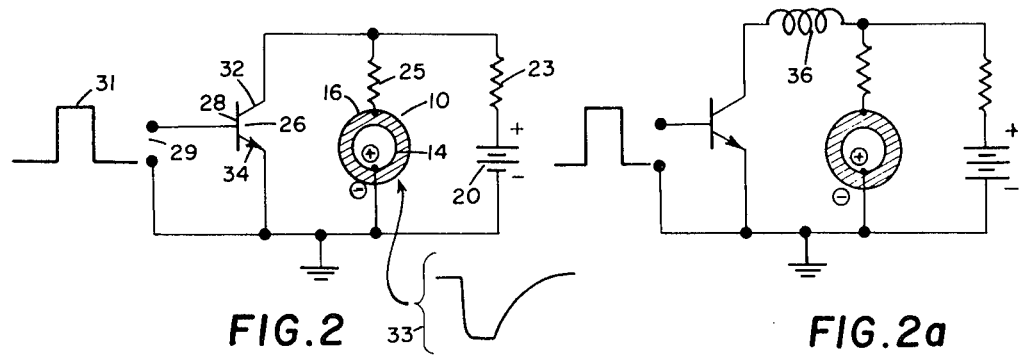
FIG. 2 shows one of many alternate circuit arrangements suitable for use in this invention.
FIG. 2a shows a modification of the circuit of FIG. 2.

A variety of simple circuits may be used to apply suitable command pulses to the transducer. FIG. 2 shows one example in which the capacitance of the transducer is used as part of the pulse shaping circuit. In FIG. 2, transducer 10 is shown schematically in cross section. The encircled polarity signs indicate that the ceramic tube employed in this example was polarized during manufacture with the inner electrode positive, and the outer electrode negative. A dc supply 20, shown for simplicity, as a battery has the negative terminal connected to the inner electrode 14. The positive terminal of supply 20 is connected through series resistors 23, 25 to the outer electrode 16. Resistor 23 has a relatively high resistance and resistor 25 has a relatively low resistance.

Transistor 26 is used as a switch. Collector 32 is connected to the junction between resistors 23 and 25, and the emitter 34 is connected to the negative side of supply 20. Control pulses 31 may be applied between base 28 and emitter 34 via terminals 29.

Under quiescent conditions, the switch is open and the transducer capacitance is charged to the voltage of supply 20. Since the polarity of the applied voltage is the opposite of the original polarizing polarity, the transducer is in an expanded state.

When a pulse 31 is applied to terminals 29, transistor 26 switches to a low value of collector-emitter resistance for the duration of the pulse. This permits the capacitance of the transducer to discharge rapidly through low resistance 25 and the transistor "ON" resistance. The transducer responds by contracting suddenly, expelling a small quantity of liquid at orifice 5, as previously described.

When pulse 31 falls approximately to zero, transistor 26 turns off, allowing the transducer capacitance to recharge through resistors 23, 25 to the voltage of supply 20. Due to the higher value of resistor 23, the charging takes place relatively slowly. The transducer responds by expanding slowly, drawing liquid from tube 8 to replace the liquid expelled, as previously described. Thus, in response to control pulses 31, the circuit provides short rise time command pulses having relatively long decay times, as shown at 33. For best results, the decay time should be at least four times the rise time.

Figure 2B:
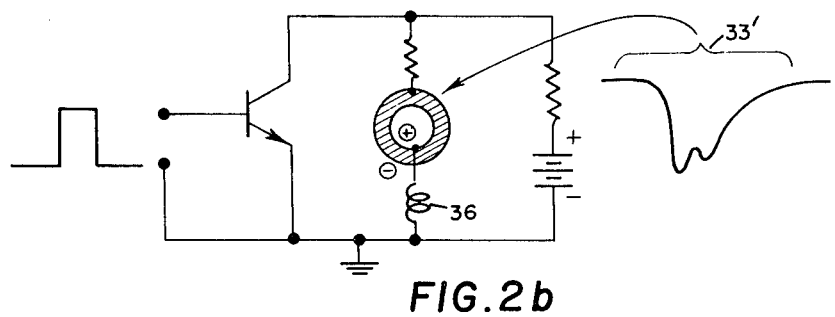
FIG. 2b shows another modification of the circuit of FIG. 2.

Some improvement in performance is obtained by adding an inductance 36 picofarads series with the collector of the transistor, as shown in FIG. 2a, or in series with the transducer, as shown in FIG. 2b.

For a transducer having capacitance of about 5,000 picofards an inductance in the range of 1 to 10 millihenries has given good results. A typical wave form for the pulse voltage applied to the transducer is shown at 33'.

An example of a satisfactory system design is summarized in the following table, referring to the construction of FIG. 1:

Ceramic tube 13
| | |
|---|---|
| Composition — lead zirconate-lead titanate type having the following published nominal characteristics: | |
| $K_3$ | 3400 |
| $k_{31}$ | −.388 |
| $d_{31}$ | $-274 \times 10^{-12}$ meter/volt |
| $s_{11}^E$ | $16.5 \times 10^{-12}$ meter$^2$/Newton |
| $\sigma$ | $7.5 \times 10^3$ kilograms/meter$^3$ |
| Length | 12.7 millimeters |
| Inside diameter | .76 millimeter |
| Wall thickness | .25 millimeter |

Orifice 5
| | |
|---|---|
| Diameter | .06 millimeter |
| Length | .06 millimeter |

Supply tube 8
| | |
|---|---|
| Inside diameter | .41 millimeter |
| Length | 12.7 millimeters |

Liquid
| | |
|---|---|
| Water base ink having viscosity and surface tension similar to water | |

Drive circuit — FIG. 2b
| | |
|---|---|
| Supply 20 | 50 volts |
| Transistor 26 | MJ 421 |
| Resistor 25 | 200 ohms |
| Resistor 23 | 1000 ohms |
| Inductor 36 | 2 millihenries |

Central pulse 31
| | |
|---|---|
| Amplitude | 3 milliamperes |
| Duration | 20 microseconds |

Droplets
| | |
|---|---|
| Diameter of ink spot | .13 millimeter |
| Exit velocity | 1 to 2 meter/second |
| Repetition rate | up to 50,000/second |

For definitions of the characteristics listed for the ceramic material, reference may be made to: IRE Standards on Piezoelectric Crystals - Measurements of Piezoelectric Ceramics. Proceedings of the IRE Vol. 49, No. 7, July 1961 (IEEE 179-1961).

Figure 3:
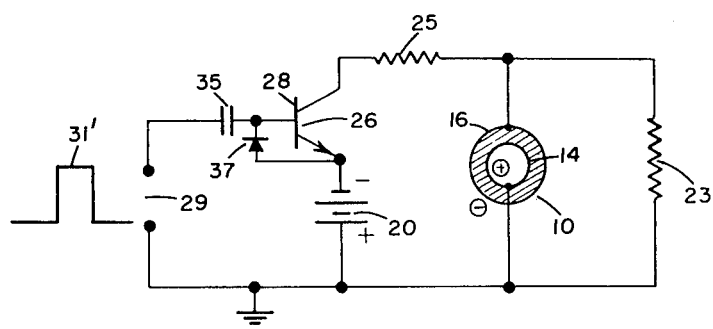
FIG. 3 shows another suitable circuit arrangement.

With the circuit of FIG. 2 there is a limit to the supply voltage 20 beyond which depolarization of the ceramic may result. The limit depends on the composition of the ceramic material and on the wall thickness of tube 13. FIG. 3 illustrates a circuit arrangement that does not have these limitations but requires additional components.

In FIG. 3 the positive terminal of supply 20 is connected to the inner electrode 14 of transducer 10 and the negative terminal is connected through transistor switch 26 and resistor 25 to outer electrode 16. When the transistor is off, no voltage appears at the transducer. When the transistor is on, the voltage of supply 20 is applied to the transducer with the same polarity used during polarization of the ceramic tube, thus, depolarization due to the excessive voltage cannot take place. Blocking capacitor 35 couples the control pulses applied at terminals 29 to the transistor base 28. Diode 27 permits the normal quiescent charge to be reestablished at capacitor 35 as the control pulse falls to zero.

Under quiescent conditions transistor 26 is turned off and, therefore, transducer 10 has no charge. When a control pulse 31' occurs, transistor 26 turns on and the capacitance of transducer 10 charges rapidly through low resistance 25 and the "ON" resistance of the transistor. This requires a low impedance supply at 20. The transducer responds by contracting rapidly, expelling liquid through the orifice. As pulse 31' falls to zero, transistor 26 is turned off and the capacitance of the transducer discharges relatively slowly through large resistance 23. The transducer responds by expanding slowly and drawing replacement liquid from tube 8. An inductance may be connected in series with the transistor transducer as in FIGS. 2a or 2b.

Figure 4:
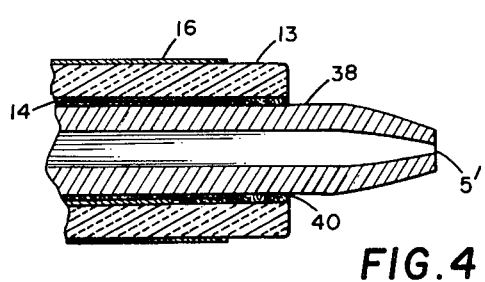
FIG. 4 is a partial, sectional view illustrating a modified transducer-orifice arrangement.

If the liquid is corrosive to the electrode material of the ceramic tube, the construction of FIG. 4 may be employed. In this case, the small bore liquid supply tube 38 extends through transducer tube 13. It is shown necked down at the end to form orifice 5'. However, a watch jewel, such as 11 in FIG. 1, or other orifice arrangement may be used. Transducer tube 13 surrounding the conduit is in stress transmitting engagement with the wall of the conduit by virtue of epoxy cement 40 and, therefore, the transducer is coupled to the liquid within the conduit. This arrangement results in reduced sensitivity because of the stiffness of conduit tube 38 and, therefore, higher pulse energy is required to expel liquid and it is advantageous to use a circuit such as shown in FIG. 3.

It is not necessary that the liquid flow through the transducer. For example, in FIG. 5, conduit 42 comprises small bore supply section 8' enlarged at the end thereof for attachment of orifice plate 11. A T-extension 41 couples to one end of transducer 10. The other end of transducer 10 is closed by cap 43. When a command pulse is applied, the transducer contracts suddenly, expelling liquid from the transducer into conduit 42. The resulting acoustic pressure pulse overcomes surface tension at orifice 5, causing ejection of liquid such as droplet 7. The high acoustic impedance of supply portion 8' retards flow back toward the reservoir. Subsequently, as the transducer expands slowly, liquid flows into the transducer from supply tube 8'.

This invention is not limited to the use of tubular piezoelectric transducers. Different geometrics and constructions may be used, as well as different transducer principles. One variation is to replace piezoelectric ceramic tube 13 of FIGS. 1, 4, 5 with a tube formed from an electrostrictive material having little or no remanent polarization. In this case, a pulse of either polarity will cause the same volume contraction, and a circuit such as shown in FIG. 3 would be used.

Magnetostrictive transducers also may be employed. One way to do this is to use magnetostrictive material in forming tube 38 of FIG. 4. Transducer tube 13 then is replaced by an energizing winding magnetically coupled to the tube. To eject liquid, a short rise time current pulse is applied to the winding. Thereafter the current should decay slowly so that the surface tension at orifice 5' is not overcome while replacement liquid flows into the transducer portion of tube 38.

As another example, FIG. 6 shows a sectional view of a transducer-conduit assembly employing a thin piezoelectric ceramic disc 44. It is clamped around the periphery between O-ring gaskets 46, 47 within a housing made up of members 49, 50. A small cross section annular passageway 51 is formed around the disc by the inner walls of body members 49, 50, O-rings 46, 47, and the exposed edge of disc 44. A small bore liquid supply tube 8 is secured in opening 52 in body member 50. The opening communicates with annular passageway 51. Tube 8 may extend to a liquid reservoir or may be coupled thereto by larger tube 6. A second opening 54 also communicates with annular passageway 51 and terminates at orifice plate 11. Thus, a liquid conduit is formed by supply tubes 6 and 8, opening 52, two parallel portions of annular passageway 51, opening 54, and orifice plate 11.

Ceramic disc 44, exposed to the liquid only at the rim, acts as an electroacoustic transducer coupled to the liquid adjacent to orifice 5. Flexible lead wires 55, 56 are soldered to the electrodes 58, 59 of disc 44 and act as terminals for the transducer.

When it is desired to expel liquid from orifice 5 a short rise time voltage pulse is applied to terminal wires 55, 56 with polarity opposite the polarization polarity. This results in sudden expansion of the diameter of transducer 44, displacing liquid from annular passageway 51. The resulting acoustic pressure pulse expels liquid from orifice 5. As the pulse slowly goes to zero, liquid is pulled into annular passageway 51 from tube 8 to replace the liquid previously expelled.

Although many different circuit arrangements may be constructed to drive transducer 44, it is convenient to use a circuit similar to the circuit of FIG. 2. In this case, however, the negative side of supply 20 is connected to the electrode of transducer 44 that was negative during polarization. With this polarity, the quiescent voltage applied to transducer 44 holds the disc in diameter contracted condition. When transistor 26 is turned on by a pulse at terminals 29 the capacitance of the transducer discharges rapidly through the transistor and low resistance 25. The transducer responds by expanding suddenly to the diameter it had prior to connection of power supply 20 and expels liquid, as previously described. When the control pulse falls to zero, the transducer recharges to the voltage of supply 20, contracting in diameter as it does so, to pull in fresh liquid from tube 8.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What we claim is:

1. A system adapted upon pulsing to expel a small quantity or a succession of small quantities of liquid in controlled manner, comprising:

a reservoir containing said liquid;

a conduit connected to said reservoir and communicating with the liquid therein and filled with said liquid under small or zero static pressure, said conduit having an exit orifice which is sufficiently small that surface tension in the absence of pulsing prevents said liquid from flowing therefrom;

a piezoelectric transducer having electrical terminals and having electrical capacitance measured between said terminals, said transducer being coupled to the liquid in said conduit and adapted to apply a pressure pulse to said liquid in response to an electrical pulse applied to said terminals to displace a small quantity of said liquid overcoming said surface tension to expel a small quantity of said liquid through said orifice;

a first circuit connected between said terminals including a normally open switch and having relatively low resistance when said switch is closed;

a second circuit connected between said terminals having relatively high resistance;

a dc voltage source connected in series in one of said circuits;

pulse means for closing said switch for a predetermined short time interval whereby a voltage pulse is applied to said transducer to cause the ejection of a droplet from said orifice;

the resistance between said transducer terminals when said switch is open being sufficiently high compared with the resistance between said terminals when said switch is closed that the said voltage pulse applied to said transducer has decay time which is at least four times the rise time of said pulse.

2. A system as described in claim 1 in which said switch is a bipolar transistor and said means for closing said switch comprises means for applying a control pulse to the base of said transistor.

3. A system adapted upon pulsing to expel a small quantity or a succession of small quantities of liquid in controlled manner, comprising:

a reservoir containing said liquid;

a conduit connected to said reservoir and communicating with the liquid therein and filled with said liquid under small or zero static pressure, said conduit having an exit orifice which is sufficiently small that surface tension in the absence of pulsing prevents said liquid from flowing therefrom;

a piezoelectric transducer having electrical terminals and having electrical capacitance measured between said terminals, said transducer being coupled to the liquid in said conduit and adapted to apply a positive pressure pulse to said liquid in response to a voltage pulse of suitable polarity applied to said terminals to displace a small quantity of said liquid overcoming said surface tension to expel a small quantity of said liquid through said orifice;

a first circuit connected between said terminals including a normally open switch and having relatively low resistance when said switch is closed;

a second circuit connected between said terminals having relatively high resistance in series with a dc voltage source having polarity which is the opposite of said suitable polarity;

pulse means for initiating the ejection of a droplet from said orifice by closing said switch for a predetermined short time interval whereby a voltage pulse of said suitable polarity is applied to said transducer;

the resistance between said transducer terminals when said switch is open being sufficiently high compared with the resistance between said terminals when said switch is closed that the said voltage pulse applied to said transducer has decay time which is at least four times the rise time of said pulse.

4. A system as described in claim 3 in which said switch is a bipolar transistor and said means for closing said switch comprises means for applying a control pulse to the base of said transistor.

5. A system adapted upon pulsing to expel a small quantity or a succession of small quantities of liquid in controlled manner, comprising:

a reservoir containing said liquid;

a conduit connected to said reservoir and communicating with the liquid therein and filled with said liquid under small or zero static pressure, said conduit having an exit orifice which is sufficiently small that surface tension in the absence of pulsing prevents said liquid from flowing therefrom;

a piezoelectric transducer having electrical terminals and having electrical capacitance measured between said terminals, said transducer being coupled to the liquid in said conduit and adapted to apply a positive pressure pulse to said liquid in response to a voltage pulse of suitable polarity applied to said terminals to displace a small quantity of said liquid overcoming said surface tension to expel a small quantity of said liquid through said orifice;

a first circuit connected between said terminals including a dc voltage source having polarity which is the same as said suitable polarity in series with a normally open switch and having relatively low resistance when said switch is closed;

a second circuit connected between said terminals having relatively high resistance;

pulse means initiating the ejection of a droplet from said orifice by closing said switch for a predetermined short time interval whereby a voltage pulse of said suitable polarity is applied to said transducer;

the resistance between said transducer terminals when said switch is open being sufficiently high compared with the resistance between said terminals when said switch is closed that the said voltage pulse applied to said transducer has decay time which is at least four times the rise time of said pulse.

6. A system as described in claim 5 in which said switch is a bipolar transistor and said means for closing said switch comprises means for applying a control pulse to the base of said transistor.

* * * * *